United States Patent
Bui et al.

(10) Patent No.: US 7,035,951 B2
(45) Date of Patent: Apr. 25, 2006

(54) SYSTEM AND METHOD FOR AUTO-ADDRESSING DEVICES ON A MULTIPLEXING BUS BASED ON BINARY CODING

(75) Inventors: Tanh M. Bui, Cary, NC (US); Reiner E. Stockfisch, Burgfarrnbach (DE); Tobias Taufer, Roth (DE)

(73) Assignee: Saia-Burgess Automotive Inc., Cary, NC (US)

( * ) Notice: Subject to any disclaimer, the term of this patent is extended or adjusted under 35 U.S.C. 154(b) by 180 days.

(21) Appl. No.: 10/727,053

(22) Filed: Dec. 4, 2003

(65) Prior Publication Data

US 2005/0125579 A1    Jun. 9, 2005

(51) Int. Cl.
*G06F 13/00* (2006.01)

(52) U.S. Cl. ............. 710/104; 710/110; 709/208; 370/475

(58) Field of Classification Search .......... 710/104, 710/110, 9, 62, 3; 370/254, 471, 457, 475; 340/825.52, 3.5; 379/221.14; 700/24; 709/245, 709/208

See application file for complete search history.

(56) References Cited

U.S. PATENT DOCUMENTS 4,511,960 A * 4/1985 Boudreau .................. 711/219
6,009,479 A * 12/1999 Jeffries ......................... 710/8
6,700,877 B1 * 3/2004 Lorenz et al. .............. 370/254
2001/0044860 A1   11/2001 Hinrichs et al.

OTHER PUBLICATIONS

"A complete compiler approach to auto-parallelizing C programs for multi-DSP systems" by Franke, B.; O'Boyle, M.F.P. (abstract only) Publication Date: Mar. 2005.*

Hernard, J., *Automatic Signal* Converter Address Configuration in Multipoint Network, IBM Corp., 24(12), 6481-2 (1982).

* cited by examiner

*Primary Examiner*—Gopal C. Ray
(74) *Attorney, Agent, or Firm*—Jacobson Holman PLLC

(57) ABSTRACT

A system and method for auto-addressing devices on a multiplexing bus in which a plurality of devices are arranged in series, with each having a bus in and bus out. During an initial evaluation, and beginning with a low bus in, each device inverts the incoming signal so that a device with a low bus in has a high bus out. During a second evaluation, the high or low state of the bus in is inverted only if the bus out in the first evaluation was high. Similarly, during subsequent evaluations, the high or low state of the bus in is inverted only if the bus out state of all previous evaluations was high. Ultimately, only one device will have a high bus out, with all bus out states from previous evaluations also having been high, at which point all addresses are fully decoded.

12 Claims, 2 Drawing Sheets

SYSTEM AND METHOD FOR AUTO-ADDRESSING DEVICES ON A MULTIPLEXING BUS BASED ON BINARY CODING

BACKGROUND OF THE INVENTION

1. Field of the Invention

The present invention is related to the field of addressing multiple devices on a multiplexing bus and, more particularly, to a binary-coded method for auto-addressing a plurality of devices within a network by their positions in the network.

2. Description of the Related Art

Known methods of auto-addressing multiple devices on a multiplexing bus include memory-flashing and pin-coding. However, these approaches are not cost-effective, and require unique components such as individually pre-addressing devices or pre-addressing connectors. Therefore, a need exists for an auto-addressing method that is compatible with typical multiplexing bus systems and able to address devices simply and cost-effectively.

SUMMARY OF THE INVENTION

In view of the foregoing, one object of the present invention is to overcome the difficulties of auto-addressing systems and methods that require special components by providing a system and method that is able to auto-address a plurality of devices based upon their position in the network.

Another object of the present invention is to provide an auto-addressing method for use on a multiplexing bus system with a master and sequentially-arranged slave devices, in which the slave devices have identical electronic components and execute the same logical flow.

A further object of the present invention is to provide an auto-addressing method executable via either a microprocessor alone or through a combination of software and hardware.

An additional object of the present invention is to provide an auto-addressing method using a sequence of evaluations based on the current bus-in signal and all previous bus-out signals to determine an address for each device on the bus.

Yet another object of the present invention is to provide a digital auto-addressing method that is not affected by variations in supply voltage, ambient temperature, sense resistance values, etc., and which converges quickly, needing only $\log_2(n)$ measurements for n devices.

It is yet another object of the invention to provide an auto-addressing method which can be cost-effectively incorporated into existing multiplexing bus systems to efficiently decode all addresses without specialized components.

In accordance with this and other objects, the present invention is directed to a method for auto-addressing devices on a multiplexing bus having a master control module and a plurality of slave devices arranged in series, with each slave device having an address register, a bus in and a bus out. A first bus signal having a first state (either high or low) is output from the master control module to the first slave device and then sequentially passed to each subsequent slave device in the series. Upon receipt of the bus signal at the bus in, each slave device determines the content of its respective address register and inverts the bus in signal to an inverted bus out signal only if the value of its respective address register content is zero. The address register content of each slave device is updated with the respective bus out value for that device after the first measurement, and the process is repeated with a second bus signal, again having the same first state, being output from the master control module and passed through the slave devices in series. When $\log_2(n)$ measurements have been taken, with n being the number of slave devices daisy-chained together, the process is complete and the address of each of the slave devices will have been determined.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
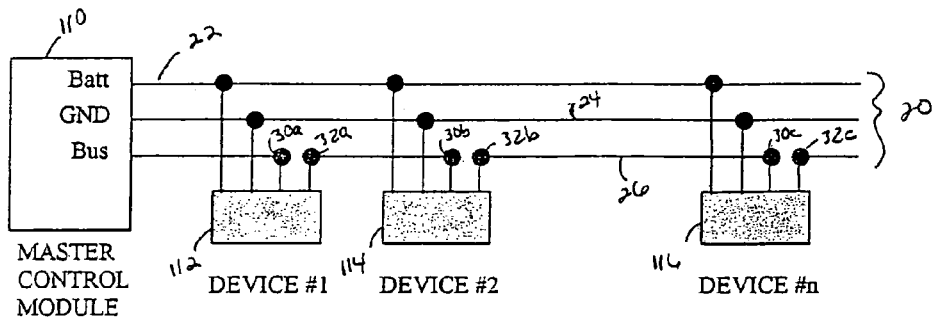
FIG. 1 shows a typical arrangement of serially-arranged devices in a multiplexing bus system.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

The auto-addressing method according to the present invention works on a typical multiplexing bus system, such as one used in vehicular architecture and representatively depicted in FIG. 1. Such a bus system includes a master control module 110 and a plurality of slave devices 112, 114, 116 connected in series over a three-wire cable 20, in which a first wire 22 carries the power supply voltage, a second wire 24 provides ground, and a third wire 26 is the bus line. Slave devices in this bus arrangement can be spliced to the cable 20 and are controlled by the master control module 110. Each slave device has an address register with a length of $\log_2(n)$ bits, with n representing the maximum number of allowed devices on the bus.

The bus line 26 enters a bus input side 30 of the slave devices 112, 114, 116 and exits a bus output side 32 thereof, sequentially, such that the bus output 32a of the first slave device 112 is the bus input 30b of the second slave device 114, and the bus output 32b of the second slave device 114 is the bus input 30c of the next slave device 116, and so forth. The bus input 30a of the first slave device 112 is directly tied to the master control module 110.

Figure 2:
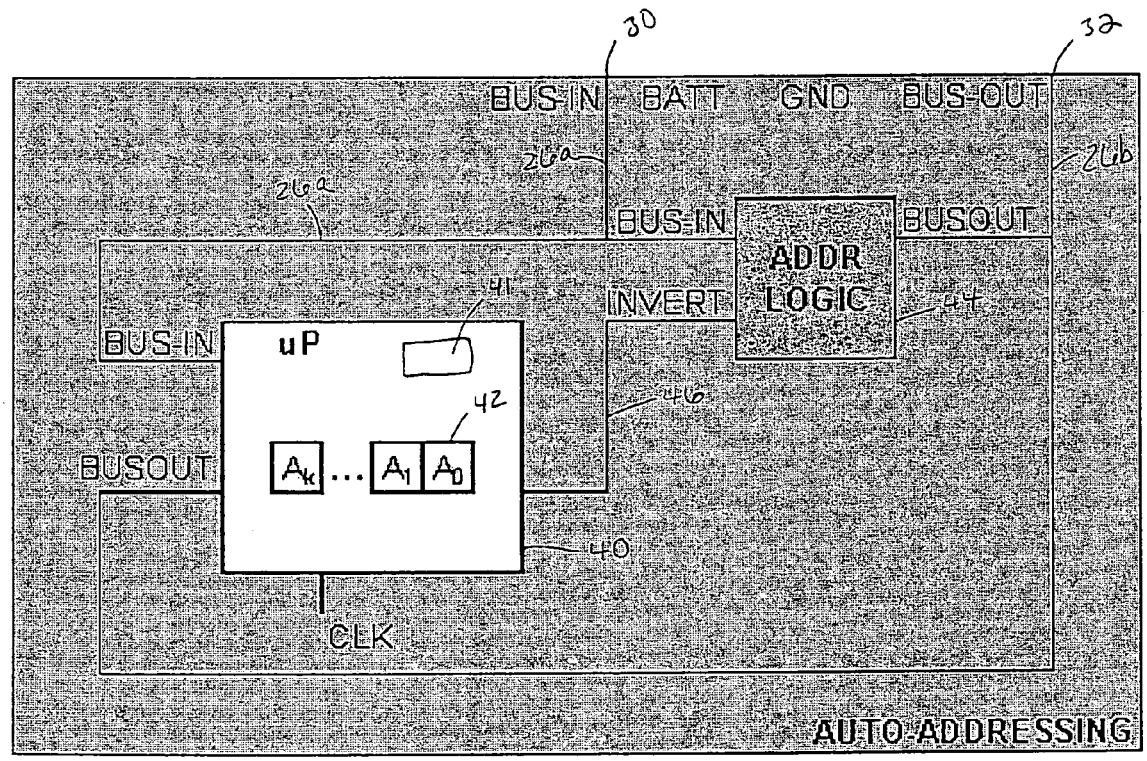
FIG. 2 is a representative electrical schematic of the auto-addressing scheme of a slave device within a multiplexing bus system according to the present invention.

An electrical schematic representative of the auto-addressing circuitry of each slave device is illustrated in FIG. 2. While the execution according to the present invention can be implemented either in software via a microprocessor or by a combination of software and simple hardware, the implementation illustrated in FIG. 2 represents a software/hardware combination.

As shown in FIG. 2, the slave device includes a microprocessor 40 with an address register 42 and a measurement counter 41, and an address logic block 44. Both the microprocessor and the logic block 44 receive the bus in signal 26a from the bus line 26 via the bus input 30.

Upon receipt of the bus in signal 26a through the bus input 30, the microprocessor 40 checks the address register 42. If the value stored in the address register is zero, the microprocessor enables the inverter signal 46; conversely, if the value stored in the address register 42 is not zero, i.e., at least one of the $\log_2(n)$ bits is a "1", the microprocessor disables the inverter signal 46.

The logic block 44 receives the inverter signal 46 and the bus in signal 26a, and either inverts the bus in signal 26a or passes such signal through unchanged, depending upon the inverter signal. According to a preferred embodiment, the logic block is configured to perform a logic XOR operation of the bus in and inverter signals, inverting the bus in signal only if both inputs are high or if both inputs are low.

The logic block 44 outputs the bus out signal 26b which is output via the bus output 32 to the bus line 26 for input to the bus input 30 of the next slave device. In addition, the bus out signal 26b is fed back to the microprocessor 40 to enable the microprocessor to update the next bit in the address register 42 with the most recent output state, as will be explained in greater detail subsequently herein.

As an alternative embodiment, the slave device circuitry may be embodied entirely in software in which case the logic block is eliminated. In such a software embodiment, the bus in signal 26a is received by the microprocessor 40 as shown in FIG. 2, but the microprocessor outputs the bus out signal directly to the bus line 26. In this embodiment, there is no feed back of the bus out signal to the microprocessor as the microprocessor already knows the latest output state.

Figure 3:
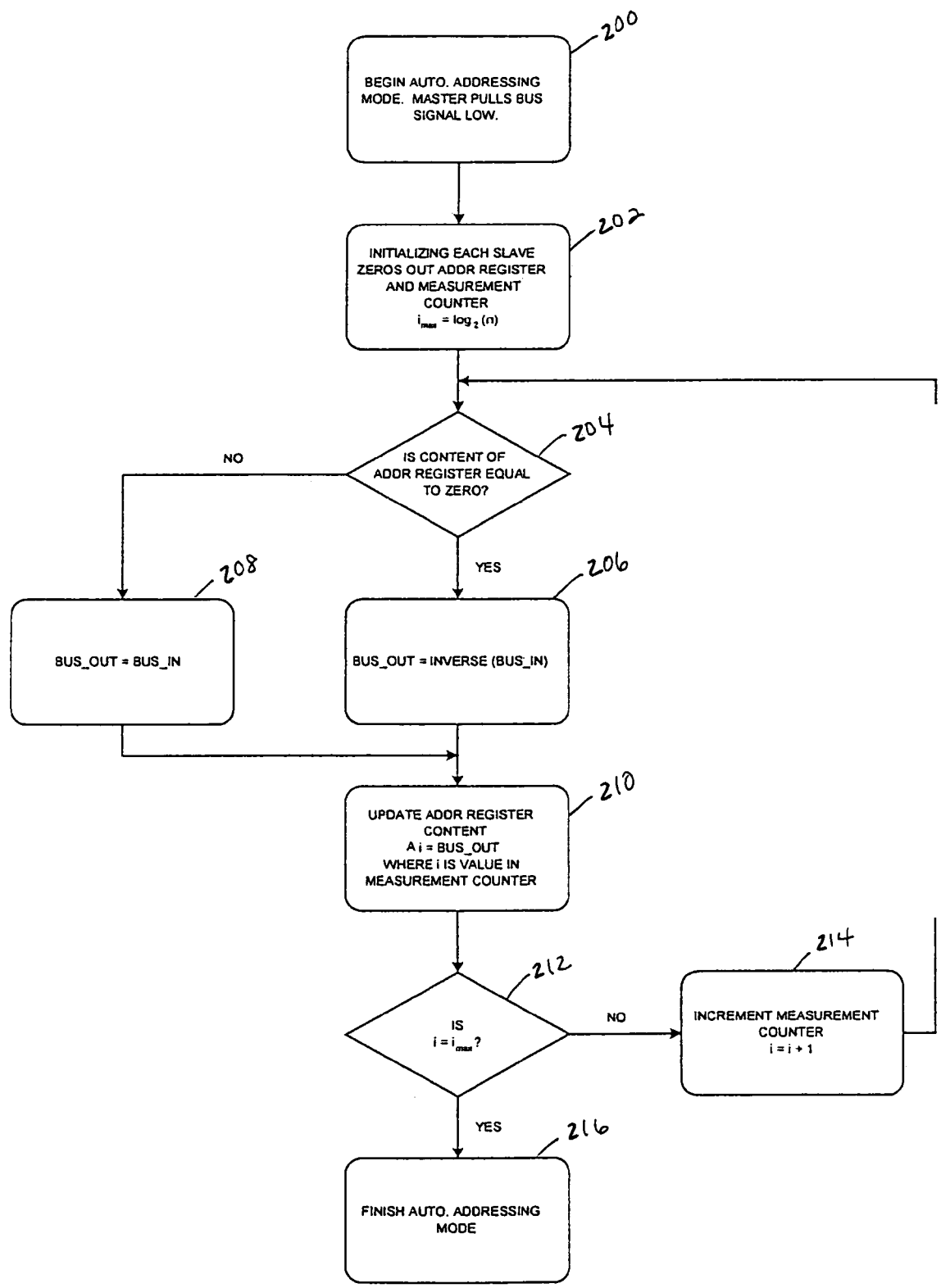
FIG. 3 is a flow chart of the addressing method according to the present invention.

The auto-addressing sequence according to the present invention is summarized in FIG. 3 and is initiated by the master control module. To begin the auto-addressing sequence or mode, step 200, the master control module 110 sends a command signal to each of the slave devices 112, 114, 116, and pulls the bus signal on bus line 26 either low or high. In response to receiving the command signal, each slave device initializes its own address register to zero, step 202. Thereafter, throughout the measurements necessary to complete the address-decoding sequence, the master control module holds the bus signal at the same state, whether low or high.

All slave devices make $\log_2(n)$ measurements, where n is the maximum number of devices allowed on the bus. When all slave devices receive the command from the master control module to auto-address and subsequently zero out their $\log_2(n)$ bit address registers, the value, i, of the measurement counter 41 within the microprocessor 40 is also set to zero and the measurement counter is initialized such that the total number of measurements, $i_{max}$, is equal to $\log_2(n)$, step 202. Since n is the maximum number of devices allowed on the bus, a bus having sixteen devices requires four measurements to determine the addresses of each of the devices such that $i_{max}$ is set to four; a bus having eight devices requires three measurements such that $i_{max}$ is set to three, and so on.

Each of the subsequent measurements follows the same procedure. Particularly, in response to receiving the bus in signal 26a, the microprocessor 40 in each device examines the content of its respective address register 42 and enables the inverter signal 46 only if the content of the register is equal to zero. At the first measurement, all of the registers have a content of zero due to the initialization performed in response to the command signal.

For each slave device, if the value stored in the device's register is zero, i.e., all $\log_2(n)$ bits are "0", step 204, the inverter signal 46 is enabled and the bus output of that device is the inverse of its bus input, step 206. If, on the other hand, the address stored in the register is not zero, i.e., if any of its $\log_2(n)$ bits is a "1", step 204, then the inverter signal is disabled and a transmission gate or pass-through within the logic block 44 is enabled; hence, the bus output of a slave device in which the content of the register 42 is not zero is of the same state as its bus input, step 208.

At the end of each measurement, the address register is updated to reflect the output state resulting from the last measurement, step 210, with the least significant bit (LSB) of the address register corresponding to the first measurement, the next bit corresponding to the second measurement, and so on. The value of the measurement counter, i, is then compared with the total number of measurements, $i_{max}$, to see if $i=i_{max}$, step 212. If i does not equal $i_{max}$, the measurement counter is incremented by one, step 214, and the next measurement is initiated. Conversely, if $i=i_{max}$, the measurement sequence has been completed, step 216.

For purposes of illustration, the measurement sequence will now be examined in greater detail in an embodiment in which the bus signal from the master control module is held high, while noting that the invention works equally well with the bus signal held low.

Following initialization to begin the auto-addressing sequence, a high bus signal is sent to the devices which then conduct a first measurement to determine if the content of their respective address registers is zero, step 204. More specifically, the first device 112 (closest to the master) reads the bus signal which is high, i.e., a "1". Since the content of the address register of the first device is zero from the initialization, the bus output 32a of the first device 112 is the inverse of the bus input 30a, step 206, and since the bus input is a "1", the bus output 32a is a "0". This bus output is the bus input 30b of the second device 114.

Correspondingly, because the content of its address register is also zero, the second device 114, in turn, inverts its bus input signal 30b, so that its bus output 32b is a "1". Thus, since the value of the register of each device is set to zero at initialization, each device inverts its incoming signal so that, at the first measurement, the output of each device is the inverse of the output of the device before it, step 206. Each device then stores its own output state in the LSB of its address register ($A_0$), step 210. Table 1 summarizes the input and output states of all of the slave devices on the bus at the first measurement, with Device 0 being the first device immediately following the master control module.

TABLE I

| | First Measurement Master BUS Signal "1" | |
|---|---|---|
| | $BUS_{IN}$ | $A_0 = BUS_{OUT}$ |
| Device 0 | 1 | 0 |
| Device 1 | 0 | 1 |
| Device 2 | 1 | 0 |
| Device 3 | 0 | 1 |
| Device 4 | 1 | 0 |
| Device 5 | 0 | 1 |
| Device 6 | 1 | 0 |
| Device 7 | 0 | 1 |
| Device 8 | 1 | 0 |
| Device 9 | 0 | 1 |
| Device 10 | 1 | 0 |
| Device 11 | 0 | 1 |
| Device 12 | 1 | 0 |
| Device 13 | 0 | 1 |
| Device 14 | 1 | 0 |
| Device 15 | 0 | 1 |

The value i in the measurement counter is then compared with the maximum value for i, $i_{max}$, step 212, to determine if the measurement sequence has been completed. If i does not equal $i_{max}$, the measurement counter is incremented by one, step 214, and the process continues with a next measurement.

In the second measurement, the master control module still holds its bus signal high, i.e., a "1". The first device 112 reads this bus signal directly and determines if the content of its register is equal to zero, i.e., all $\log_2(n)$ bits are "0", step 204. Since the content of the LSB ($A_0$) of the address register of the first device is a "0" from Table 1, the bus output 32a is the inverse of the bus input 30a, step 206, and is a "0". This output is the bus input 30b for device 114.

Device 114 then determines if the content of its register is equal to zero. Since the content of the LSB ($A_0$) of the address register of the second device is not zero, step 204, instead having a "1" in the LSB of its address register, the second device passes its bus input 30b through without inverting it, step 208; thus the bus output 32b of the second device 114 is a "0".

Device 116 then determines if the content of its register is equal to zero. Since the content of the LSB ($A_0$) of the address register of the third device has a "0" in the LSB, upon receiving bus input 30c as a "0", device 116 inverts the bus signal and has a bus output 32c of "1", step 206. This process continues in a similar fashion for each of the devices in the network.

Following the second measurement, each device again stores its own most recent output state in the next bit of its address register ($A_1$), step 210. A summary of the input and output states of all the devices on the bus after two measurements is presented in Table 2.

TABLE II

| | Second Measurement Master BUS Signal "1" | |
|---|---|---|
| | $BUS_{IN}$ | $A_1 = BUS_{OUT}$ |
| Device 0 | 1 | 0 |
| Device 1 | 0 | 0 |
| Device 2 | 0 | 1 |
| Device 3 | 1 | 1 |
| Device 4 | 1 | 0 |
| Device 5 | 0 | 0 |

TABLE II-continued

| | Second Measurement Master BUS Signal "1" | |
|---|---|---|
| | $BUS_{IN}$ | $A_1 = BUS_{OUT}$ |
| Device 6 | 0 | 1 |
| Device 7 | 1 | 1 |
| Device 8 | 1 | 0 |
| Device 9 | 0 | 0 |
| Device 10 | 0 | 1 |
| Device 11 | 1 | 1 |
| Device 12 | 1 | 0 |
| Device 13 | 0 | 0 |
| Device 14 | 0 | 1 |
| Device 15 | 1 | 1 |

The value i in the measurement counter is then compared with the maximum value for i, $i_{max}$, step 212, to determine if the measurement sequence has been completed. If i does not equal $i_{max}$, the measurement counter is incremented by one, step 214, and the process continues with a next measurement.

In the third measurement, the master control module still holds its bus signal high, i.e., a "1". The first device 112 reads this bus signal directly and determines if the content of its register is equal to zero. Since the content of the first two bits ($A_1, A_0$) of the address register of the first device is "00" from Tables 1 and 2, step 204, the bus output 32a of the first device is the inverse of the bus input 30a, step 206, and is a "0". This output is the bus input 30b for device 114.

Device 114 then determines if the content of its register is equal to zero. Since the content of the register of the second device is not zero, instead having a "01" in its address register's $A_1, A_0$ bits, the second device passes its bus input 30b through without inverting it, step 208; thus the bus output 32b of the second device 114 is a "0".

Device 116 then determines if the content of its register is equal to zero. However, because the third device 116 has a "10" in its register for the two previous measurements, the third device does not enable its inverter but passes its bus input 30c through without inverting it, step 208; thus the bus output 32c of the third device 116 is a "0".

This process continues in a similar fashion for each of the devices in the network. Following the third measurement, each device again stores its own most recent output state in the next bit of its address register ($A_2$), step 210. A summary of the input and output states of all the devices on the bus after three measurements is presented in Table 3.

TABLE III

| | Third Measurement Master BUS Signal "1" | |
|---|---|---|
| | $BUS_{IN}$ | $A_2 = BUS_{OUT}$ |
| Device 0 | 1 | 0 |
| Device 1 | 0 | 0 |
| Device 2 | 0 | 0 |
| Device 3 | 0 | 0 |
| Device 4 | 0 | 1 |
| Device 5 | 1 | 1 |
| Device 6 | 1 | 1 |
| Device 7 | 1 | 1 |
| Device 8 | 1 | 0 |
| Device 9 | 0 | 0 |
| Device 10 | 0 | 0 |
| Device 11 | 0 | 0 |
| Device 12 | 0 | 1 |

TABLE III-continued

| | Third Measurement Master BUS Signal "1" | |
|---|---|---|
| | $BUS_{IN}$ | $A_2 = BUS_{OUT}$ |
| Device 13 | 1 | 1 |
| Device 14 | 1 | 1 |
| Device 15 | 1 | 1 |

The value i in the measurement counter is then compared with the maximum value for i, $i_{max}$, step 212, to determine if the measurement sequence has been completed. If i does not equal $i_{max}$, the measurement counter is incremented by one, step 214, and the process continues with a next measurement.

In the fourth measurement, the master control module still holds its bus signal high, i.e., at a "1". The first device 112 reads this bus signal directly and determines if the content of its address register is zero, step 204. Since the content of the first three bits ($A_2, A_1, A_0$) of the address register of the first device is "000" from Tables 1–3, the first device 112 enables its inverter and the bus output 32a is the inverse of the bus input 30a, step 206, and is a "0". This output is the bus input 30b for device 114.

Device 114 then determines whether the content of its register is equal to zero. Since the content of the register of the second device is not zero, instead having a "001" in its address register's $A_2, A_1, A_0$ bits, the second device passes its bus input 30b through without inverting it, step 208; thus the bus output 32b of the second device 114 is a "0".

Device 116 then determines if the content of its register is equal to zero. However, because the third device 116 has a "010" in its register, the third device does not enable its inverter but passes its bus input 30c through without inverting it, step 208; thus its bus output 32c is a "0". This process continues in a similar fashion for each of the devices in the network.

Following the fourth measurement, each device again stores its own most recent output state in the next bit of its address register ($A_3$), step 210. A summary of the input and output states of all the devices on the bus after four measurements is presented in Table 4.

TABLE IV

| | Fourth Measurement Master BUS Signal "1" | |
|---|---|---|
| | $BUS_{IN}$ | $A_3 = BUS_{OUT}$ |
| Device 0 | 1 | 0 |
| Device 1 | 0 | 0 |
| Device 2 | 0 | 0 |
| Device 3 | 0 | 0 |
| Device 4 | 0 | 0 |
| Device 5 | 0 | 0 |
| Device 6 | 0 | 0 |
| Device 7 | 0 | 0 |
| Device 8 | 0 | 1 |
| Device 9 | 1 | 1 |
| Device 10 | 1 | 1 |
| Device 11 | 1 | 1 |
| Device 12 | 1 | 1 |
| Device 13 | 1 | 1 |
| Device 14 | 1 | 1 |
| Device 15 | 1 | 1 |

The same sequence is performed until all $i=\log_2(n)$ measurements are made. When $i=i_{max}$, step 212, the auto-addressing mode is finished, step 216.

In each device, the content of its address register, stored in $A_i, \ldots A_2, A_1, A_0$, is the logical address of that device. Address zero is closest to the master control module, followed by addresses 1, 2, . . . , n−1, with n−1 being the last device furthest from the master control module. This is demonstrated by combining the output columns of Tables 1–4, as shown in Table 5.

TABLE V

| | $A_3$ | $A_2$ | $A_1$ | $A_0$ |
|---|---|---|---|---|
| Device 0 | 0 | 0 | 0 | 0 |
| Device 1 | 0 | 0 | 0 | 1 |
| Device 2 | 0 | 0 | 1 | 0 |
| Device 3 | 0 | 0 | 1 | 1 |
| Device 4 | 0 | 1 | 0 | 0 |
| Device 5 | 0 | 1 | 0 | 1 |
| Device 6 | 0 | 1 | 1 | 0 |
| Device 7 | 0 | 1 | 1 | 1 |
| Device 8 | 1 | 0 | 0 | 0 |
| Device 9 | 1 | 0 | 0 | 1 |
| Device 10 | 1 | 0 | 1 | 0 |
| Device 11 | 1 | 0 | 1 | 1 |
| Device 12 | 1 | 1 | 0 | 0 |
| Device 13 | 1 | 1 | 0 | 1 |
| Device 14 | 1 | 1 | 1 | 0 |
| Device 15 | 1 | 1 | 1 | 1 |

Because the foregoing method is digital in nature, it does not suffer from variation in supply voltage, ambient temperature, sense resistance values, etc. This method also converges quickly, needing only $\log_2(n)$ measurements for n devices.

The foregoing descriptions and drawings should be considered as illustrative only of the principles of the invention. The invention may be configured in a variety ways and is not limited to the specific bus arrangement of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method for auto-addressing devices on a multiplexing bus having a master control module and a plurality of slave devices arranged in series, with each slave device having an address register, a bus in and a bus out, an initial content of the address register of each slave device being zero, the method comprising the steps of:
   a) outputting a bus signal having a high state from said master control module, said bus signal being sequentially passed to said plurality of slave devices in the series, each of said slave devices determining a content of its respective address register and inverting the bus in to an inverted bus out only if said respective address register content is zero;
   b) updating the address register content with each bus out value for each slave device, respectively; and
   c) repeating steps a and b until a resulting number of stored bus out values equals $\log_2(n)$, where n is a number of slave devices, at which time an address of each of said slave devices has been determined.

2. The method as set forth in claim 1, wherein during a first measurement, each slave device inverts the bus signal received on its respective bus in because the address register content of each slave device is zero.

3. The method as set forth in claim 2, wherein during a second measurement following said first measurement, a first half of said slave devices invert their respective bus in signals and a second half of said slave devices pass their respective bus in signals to bus out without inversion, said second half having a non-zero address register content stored from said first measurement.

4. The method as set forth in claim 3, wherein during a third measurement following said second measurement, half of said first half of said slave devices invert their respective bus in signals and a remainder of said slave devices pass their respective bus in signals to bus out without inversion, said remainder having a non-zero address register content stored from at least one of said first and second measurements.

5. The method as set forth in claim 3, wherein during a last measurement, only one slave device inverts its bus in signal, a remainder of said slave devices passing their respective bus in signals to bus out without inversion, said remainder having a non-zero address register content stored from at least one previous measurement.

6. A method for auto-addressing devices on a multiplexing bus having a master control module and a plurality of slave devices arranged in series, with each slave device having an address register, a bus in and a bus out, the method comprising the steps of:
   a) receiving, by each slave device, a bus signal at the bus in, said bus signal having a first state;
   b) determining, by each slave device, whether a content of its respective address register is "0";
   c) inverting said bus signal from said first state to a second state by each slave device having an address register content of "0" and outputting the bus signal with said second state on the bus out, while each slave device having an address register content other than "0" outputs the bus signal in said first state on the bus out;
   d) storing an output state of each slave device to its respective address register, an output state of said first state being a "1" and an output state of said second state being a "0"; and
   e) repeating steps a through d for a number of measurements equal to $\log_2(n)$, where n is a total number of said plurality of slave devices, an address of each slave device being determined upon conclusion of said number of measurements.

7. The method as set forth in claim 6, wherein prior to a first measurement, each of said slave devices sets its respective address register to "0" in response to receiving a command signal from said master control module.

8. The method as set forth in claim 7, wherein during a first measurement following receipt of said command signal, each slave device inverts the bus signal received on its respective bus in.

9. The method as set forth in claim 8, wherein during a second measurement following said first measurement, a first half of said slave devices invert their respective bus in signals and a second half of said slave devices pass their respective bus in signals to bus out without inversion.

10. The method as set forth in claim 9, wherein during a third measurement following said second measurement, half of said first half of said slave devices invert their respective bus in signals and a remainder of said slave devices pass their respective bus in signals to bus out without inversion.

11. The method as set forth in claim 9, wherein during a last measurement of said number of measurements, only one slave device inverts its bus in signal, a remainder of said slave devices passing their respective bus in signals to bus out without inversion.

12. A method for auto-addressing devices on a multiplexing bus having a master control module and a plurality of slave devices arranged in series, with each slave device having a bus in, a bus out, and an address register for storing respective output states with a low output state stored as "0" and a high output state stored as "1", the method comprising the steps of:
   initializing, in response to a command signal received from said master control module, the address register of each of said plurality of slave devices to "0";
   setting a measurement counter such that a total number of measurements is equal to $\log_2(n)$, where n is a number of said slave devices;
   receiving, at the bus in of a first slave device, a first bus signal having a high state from said master control module;
   inverting said first bus signal from said high state to a low state in response to the address register of said first device being "0" and outputting at bus out the low state first bus signal;
   receiving, at the bus in of a second slave device, the low state first bus signal;
   inverting said low state first bus signal to a high state in response to the address register of said second device being "0" and outputting at bus out a high state first bus signal;
   receiving, at the bus in of an nth slave device, a first (n−1) bus out signal from an (n−1) slave device;
   inverting said first (n−1) bus out signal in response to the address register of said nth device being "0" and outputting at bus out an inverted first (n−1) bus out signal;
   storing by each of said first through nth devices in their respective address registers, a respective first output state at bus out as a first measurement;
   receiving, at the bus in of said first slave device, a second bus signal having a high state from said master control module;
   inverting said second bus signal from said high state to a low state in response to the address register of said first device being "0" and outputting at bus out the low state second bus signal;
   receiving, at the bus in of said second slave device, the low state second bus signal;
   passing said low state second bus signal to bus out without inversion in response to the address register of said second device not being "0";
   receiving, at the bus in of said nth slave device, a second (n−1) bus out signal from said (n−1) slave device;
   inverting said second (n−1) bus out signal only if the address register of said nth device is "0" such that an inverted second (n−1) bus out signal is output if the address register is "0" and said second (n−1) bus out signal is output unchanged if the address register is not "0";
   storing by each of said first through nth devices in their respective address registers, a respective second output state at bus out as a second measurement; and
   receiving, at the bus in of said first slave device, an nth bus signal having a high state from said master control module and completing with said first, second through nth slave devices the total number of measurements such that an address of each slave device is determined.

* * * * *